(12) United States Patent
Rathbun, II et al.

(10) Patent No.: US 7,948,226 B2
(45) Date of Patent: May 24, 2011

(54) TRACEABLE FIBER OPTIC JUMPERS

(75) Inventors: Dale Rathbun, II, Monroe, MI (US); Christopher Charles Detering, Ann Arbor, MI (US); Conley Miller, Wyandotte, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 223 days.

(21) Appl. No.: 12/316,640

(22) Filed: Dec. 15, 2008

(65) Prior Publication Data

US 2010/0148747 A1 Jun. 17, 2010

(51) Int. Cl.
*G02B 6/44* (2006.01)
(52) U.S. Cl. ............... 324/66; 324/538; 385/101
(58) Field of Classification Search .......... 324/66, 324/538; 385/101, 55, 88
See application file for complete search history.

(56) References Cited

U.S. PATENT DOCUMENTS

| 5,644,237 | A | 7/1997 | Eslabolchi et al. |
| 5,666,453 | A | 9/1997 | Dannenmann |
| 5,821,510 | A | 10/1998 | Cohen et al. |
| 6,808,116 | B1 | 10/2004 | Eslambolchi et al. |
| 2007/0098346 | A1* | 5/2007 | Naidu et al. ............ 385/134 |
| 2008/0273844 | A1* | 11/2008 | Kewitsch ............... 385/101 |

\* cited by examiner

*Primary Examiner* — Vincent Q Nguyen

(57) ABSTRACT

An optical fiber jumper cable includes a single tracing conductor for tracing the jumper cable through a fiber cross-connect facility such as a central office. An electrical locating tone is impressed on the conductor so that the conductor radiates an electromagnetic field along the length of the fiber jumper cable. A locating tone detector is used to trace the fiber jumper cable along its length by monitoring a presence-indicating signal emitted by the locating tone detector.

10 Claims, 5 Drawing Sheets

TRACEABLE FIBER OPTIC JUMPERS

FIELD OF THE INVENTION

The present invention relates generally to the management of fiber optic cables in a fiber cross-connect facility such as a central office, and more particularly, to tracing paths of fiber optic jumpers through crowded fiber management areas of such facilities.

BACKGROUND OF THE INVENTION

As telecommunications and data networks become more fiber intensive, larger and larger numbers of fiber optic jumpers are being placed in the central office. During the course of normal business, a technician may be required to trace the path of a fiber jumper in a facility. With today's technology, a technician must trace the jumper visually (if possible), or physically grab the jumper and follow it through the fiber management portion of the route. That action, while necessary, introduces the possibility of disrupting any of the other jumpers that are in the area.

Various techniques have been used to correlate the ends of optical fiber jumpers in a central office or other optical exchange facility. U.S. Pat. No. 5,666,453 to Dannenmann teaches the use of LEDs or other indicators adjacent the terminal connectors of an optical fiber jumper. A pair of electrical conductors in the cable itself carry current to both indicators from connectors at either end. A technician provides electrical power to one of the connectors and looks for a lit indicator at the opposite end.

U.S. Pat. No. 5,821,510 to Cohen et al. teaches the use of unique optically encoded data, such as a bar code, that is associated with each jumper connector and additional encoded data associated with each exchange housing receptacle. The data is read using a handheld optical scanner and transmitted to a computer where the optical jumpers are tracked.

U.S. Pat. No. 6,808,116 to Eslambolchi et al. discloses a system wherein a radio frequency identification system is used to read RFID tags placed in ST fiber jumper connectors. A display on the reader identifies the jumper to the technician.

In each of the above techniques, the actual path a fiber jumper takes through the facility is not traced. Instead, the fiber ends are identified. A technician must know approximately where to look for each end of the jumper because both ends must be "read" to complete a trace. In a large central office with multiple bays and thousands of jumpers, it remains difficult to locate a particular jumper without knowing where to look.

There therefore remains a need for an improved technique for physically tracing an optical fiber jumper through a central office.

SUMMARY OF THE INVENTION

The present invention addresses the needs described above by providing a system and method for tracing a fiber optic jumper. In one embodiment, a method is provided for tracing an optical fiber jumper in a fiber cross connect facility containing multiple optical fiber jumpers. The method comprises the steps of impressing a jumper-locating tone on an electrical conductor extending along the jumper so that the jumper radiates an electromagnetic field surrounding the jumper along its length; and tracing the jumper by detecting the electromagnetic field using a handheld signal detector held within the electromagnetic field surrounding the jumper.

The step of tracing the jumper may further comprise placing the handheld signal detector within the electromagnetic field near a first end of the jumper; and moving the handheld signal detector along the jumper toward a second end while maintaining the detector within the electromagnetic field.

The step of tracing the jumper may include identifying the jumper at an intermediate position between two ends of the jumper by moving the handheld signal detector within the electromagnetic field at the intermediate position. In that case, the handheld signal detector may be moved within the electromagnetic field so that a presence-indicating signal emitted from the detector changes in intensity. The presence-indicating signal is an audible tone.

The method may further comprise the step of connecting a tone generator for generating the jumper-locating tone, to the conductor at an exposed portion of the conductor. The exposed portion of the conductor may be integrated with an optical connector of the optical fiber jumper, and may be electrical connector.

Another embodiment of the invention is system for traceably connecting two optical fiber positions in one or more fiber termination banks. The system comprises: an optical fiber jumper including an elongate optical fiber, a coating for protecting the optical fiber along its length, first and second optical fiber connectors at first and second ends of the optical fiber, respectively, for connecting the optical fiber into the one or more fiber termination banks; and an electrical conductor extending lengthwise with the optical fiber, the electrical conductor having at least one connecting terminal portion; a locating tone generator having a connector for connecting to the connecting terminal portion of the electrical conductor and for impressing on the electrical conductor a locating tone that causes the conductor to radiate an electromagnetic field about the jumper; and a locating tone detector for emitting a presence-indicating signal when at least a portion of the detector is within the electromagnetic field.

The presence-indicating signal may be emitted by the locating tone detector with increasing intensity as the detector is moved closer to the optical fiber jumper.

The at least one connecting terminal portion may be integrated with an optical fiber connector, in which case the conductor may be a wire and the at least one connecting terminal portion may be an exposed portion of the wire.

The at least one connecting terminal portion may be an electrical connector for connecting the tone generator. The locating tone generator may be powered by at least one battery, and may be a handheld device.

The conductor may be embedded in the coating of the optical fiber jumper cable.

In another embodiment of the invention, an optical fiber jumper cable comprises at least one optical fiber for conducting an optical signal through the cable; a coating for protecting the optical fiber along its length; first and second optical fiber connectors at first and second ends of the optical fiber jumper cable, respectively, for connecting the optical fiber into one or more fiber termination banks; only one electrical conductor extending substantially the length of the optical fiber; and at least one connecting terminal portion of the only one electrical conductor for electrically connecting the conductor to jumper tracing equipment.

Each connecting terminal portion may be integrated with one of the optical fiber connectors. The conductor may be a wire and the at least one connecting terminal portion may be an exposed portion of the wire.

The at least one connecting terminal portion may be an electrical connector for connecting the jumper tracing equipment.

DESCRIPTION OF THE INVENTION

Figure 1:
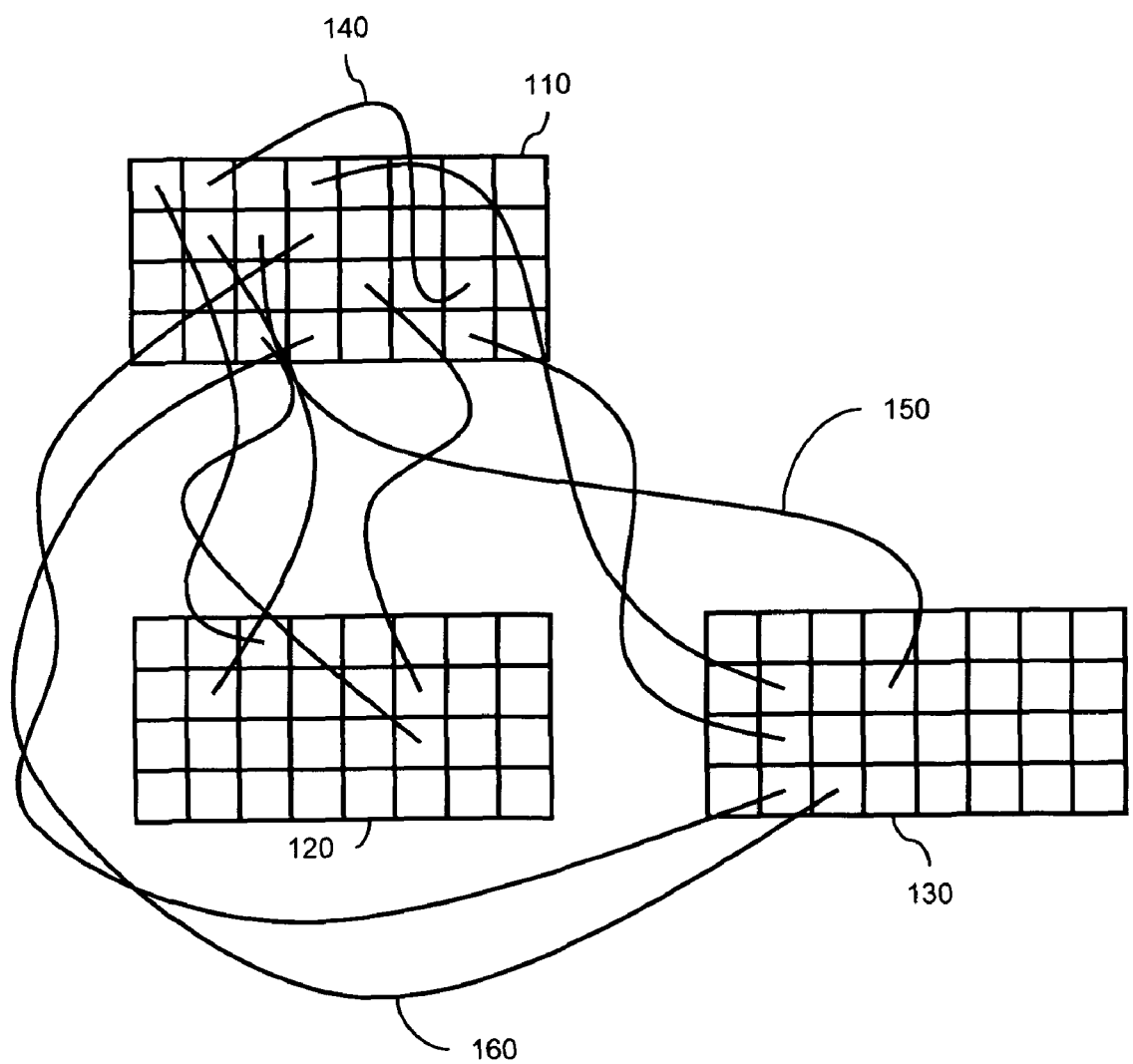
FIG. 1 is a schematic diagram showing a portion of a fiber cross connect facility.

As the use of optical equipment continues to grow so does the use of optical fiber jumpers. Optical fiber jumpers are used in a fiber cross connect facility, such as a telecommunications central office or a neighborhood cross-connect, to join fiber cables that have been terminated in modules containing arrays of optical fiber connectors. One such facility is illustrated schematically in FIG. 1, wherein the terminal modules 110, 120, 130 are interconnected by numerous fiber jumper cables such as cables 140, 150, 160.

The use of large numbers of fiber jumpers causes the potential for fiber jumper congestion in fiber management trays containing the cable portions of jumpers. As a matter of course in maintaining and updating a fiber cross connect facility, a technician is required to trace a fiber jumper through the facility, from connector module to connector module. A trace may require the determination of one end point of a jumper starting from the other end. For example, jumper 140 may be traced from a starting location in the connector module 110 to an ending location in the same module. Jumper 150 may be traced from an end position in module 110 to an end position in module 130.

It is not always known to which connector module the jumper will be traced. Various connector modules may be located in different rooms or even different buildings in the cross-connect facility. Even if an identifying code or feature of a particular fiber jumper end were known, it may be difficult to locate that fiber jumper end without physically tracing the path of the jumper through the facility.

A technician may alternatively be required to determine one or both end points starting at an intermediate position along the cable, or may be required to determine the path followed by a particular jumper through the facility. For example, jumper 150 and jumper 160 both connect module 110 and module 130, but take different paths through the facility. Those diverse paths may be specifically arranged to allow redundancy and recovery should one path through the facility be compromised in a disaster such as flood or fire. Tracing the fibers through the facility may be the only way to assure that such redundant paths exist for damage recovery.

With the fiber congestion typically seen in such a facility, tracing an optical fiber jumper requires a technician to manually observe or feel the jumper along the length to be traced. By tracing the jumper in that manner, the possibility exists that during the trace, the technician may accidentally bump or remove another fiber jumper. That can cause an outage on an unrelated optical system.

The method and apparatus of the present invention permit a fiber jumper to be traced without physically touching or moving the fiber or neighboring fibers. With the addition of a tracing wire to an optical fiber jumper, a tone generator may be placed on the jumper and a receiver may be used to locate positions along the jumper without physically tracing the jumper through the racking and fiber management trays in the fiber cross-connect facility.

Figure 2A:
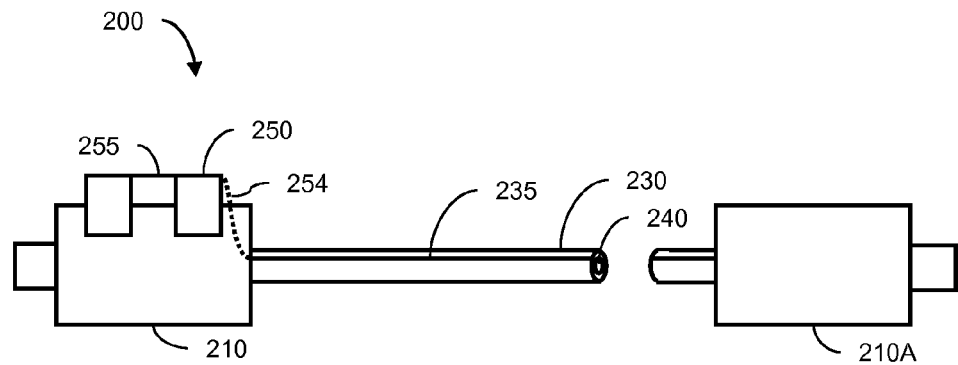
FIG. 2A is a schematic diagram showing a fiber optic jumper in accordance with the present invention.
Figure 2B:
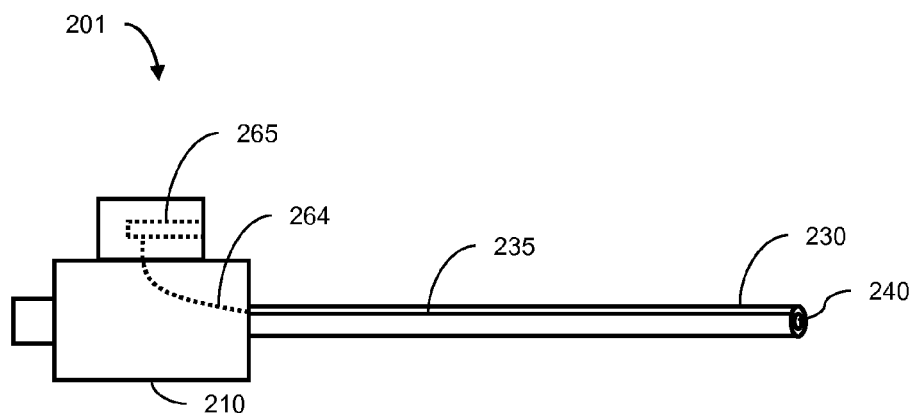
FIG. 2B is a schematic diagram showing another fiber optic jumper in accordance with the present invention.

Shown schematically in FIGS. 2A & 2B are optical fiber jumpers 200, 201 having features in accordance with the present invention. Fiber jumper 200 comprises an optical fiber cable 230 that is terminated at one end by a first optical fiber connector 210 and at an opposite end by a second optical connector 210A. Only a portion of the jumper 200 is schematically shown, with a center section of the optical fiber cable 230 removed for clarity.

The fiber cable 230 includes an optical fiber light guide 240 at its center, for transmitting the optical signal from end to end in the jumper cable. The fiber cable 230 additionally includes only one tracing conductor 235 such as a thin, single copper wire that extends along the optical fiber cable. That tracing conductor allows a technician to trace the path of a fiber with the use of a tone generator and receiver as described below.

An electrical connection to the tracing conductor 235 is accessible at or near the connector 210 on at least one end of the optical fiber jumper 200. In the embodiment shown in FIG. 2A, a lead portion 254 of the conductor electrically connects the conductor 235 with an exposed connecting terminal portion 255, supported on a raised portion 250 of the optical connector 210. The connecting terminal portion 255 of the conductor 235 is exposed for connecting a tone generator in accordance with the invention.

In another embodiment of the invention, shown schematically in FIG. 2B, a lead portion 264 of the conductor electrically connects the conductor 235 with a socket or another connector element that comprises an exposed connecting terminal portion 265. In both fiber optic jumpers 200, 201 shown FIGS. 2A, 2B respectively, the exposed connecting terminal portions 255, 265 are integrated with the optical fiber connector 210, inasmuch as the connector has been modified to include the electrical terminal portion. The terminal portion may also be integrated with the optical fiber cable itself, or may be a separate element, while remaining within the scope of the invention.

Figure 3:
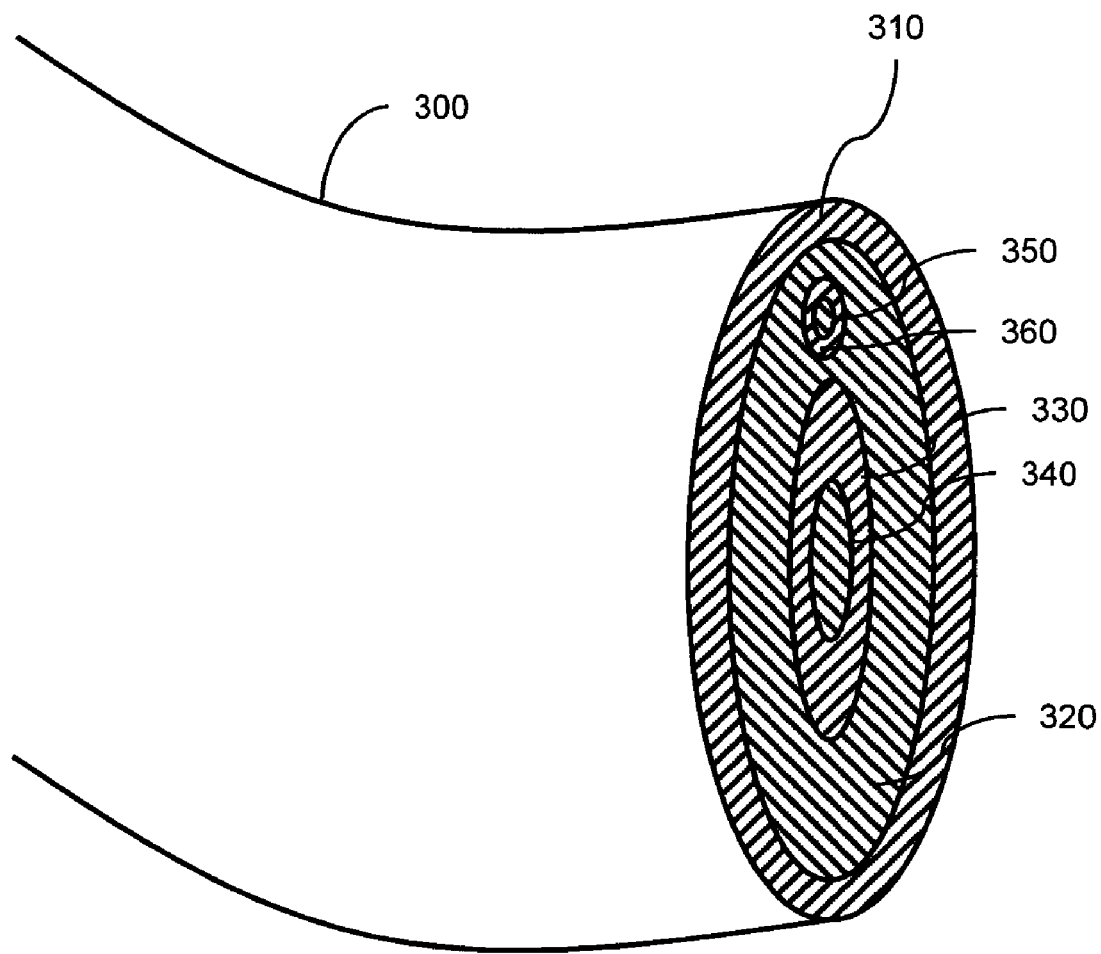
FIG. 3 is a schematic diagram showing a cross section of a fiber optic jumper in accordance with the present invention.

A cross sectional view of an optical fiber cable portion 300 of a jumper of the invention is shown in FIG. 3. An optical light guide fiber core 340 is surrounded by a coating including one or more of a cladding layer 330, a strength layer 320 and a sheathing layer 310. The cladding layer 330 provides a proper refractive index for functioning of the light guide. The cladding 330 is surrounded by the intermediate strength layer or buffer 320 that is the structural component of the cable. The sheathing or jacket layer 310 surrounds the strength layer 320.

In accordance with the present invention, a single conductor 350 extends lengthwise within the cable, and is embedded in one of the surrounding layers of the cable. In a preferred embodiment, the conductor 350 is embedded in the strength or buffer layer 320. The conductor 350 may be provided with a separate insulation layer 360 or may be a bare wire embedded in the fiber optic coating. The conductor may be a thin copper tracing wire. For example, a wire between 0.1 mm and 0.5 mm in diameter may be integrated with an optical fiber jumper having a jacket outer diameter of between 1 mm and 6 mm.

While the conductor 350 is shown in the cable 300 of FIG. 3 as embedded in the buffer layer 320, the conductor may alternatively be placed in any of the other layers such as within the outer jacket layer 310. The conductor 350 may also be placed between layers, such as between the jacket layer 310 and the buffer layer 320, or may be bonded or otherwise attached to the cable outside the jacket 310.

Furthermore, while the conductor is shown as a single tracer wire 350, one skilled in the art will recognize that other conductor configurations are also effective in transmitting a tracing signal. For example, a metallic mesh layer (not shown) may be placed beneath the jacket or integrated with the jacket. Such an conductor configuration provides additional strength to the cable in addition to carrying the tracer signal.

Figure 4:
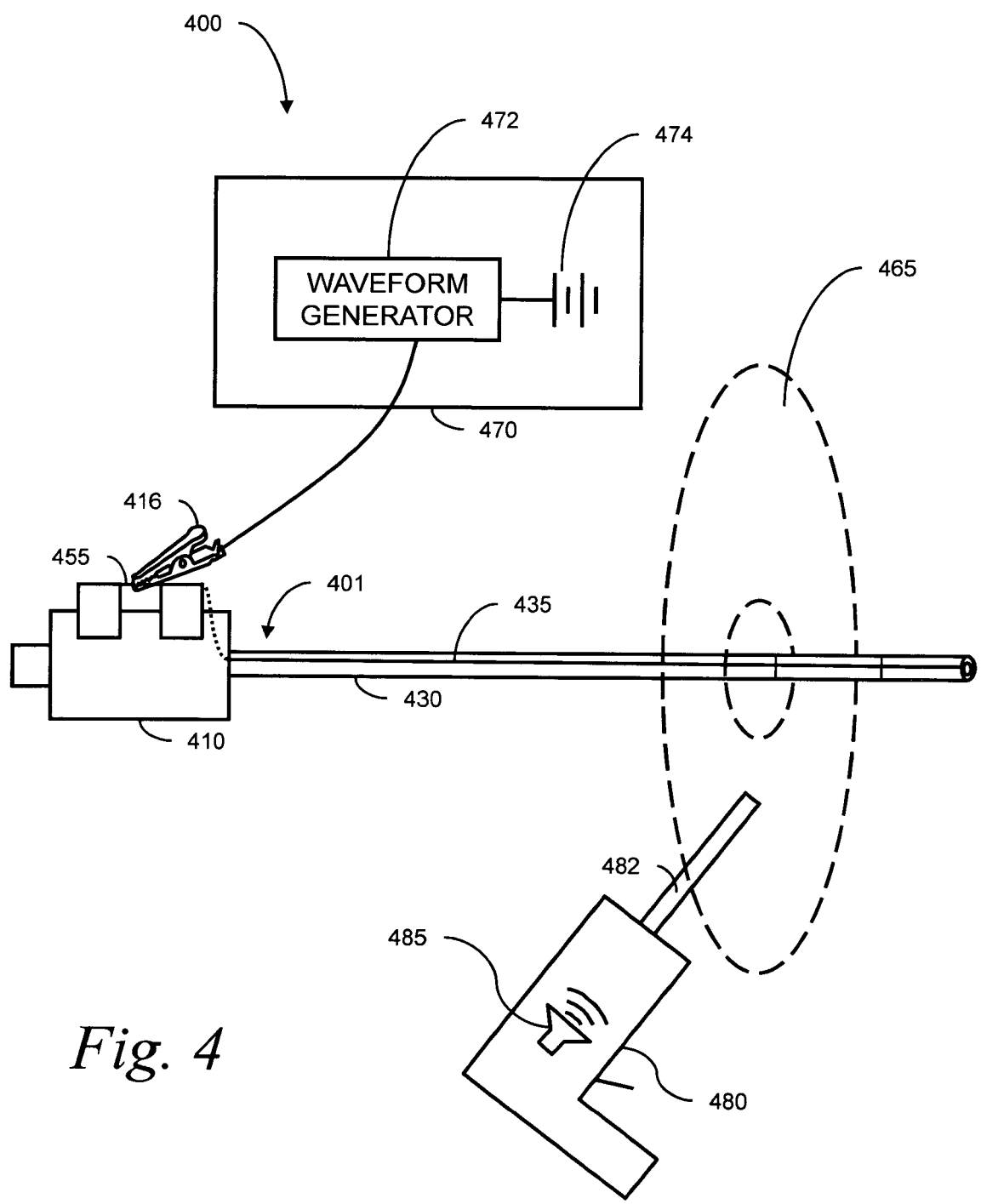
FIG. 4 is a schematic diagram showing a system for traceably connecting two optical fiber positions in accordance with the present invention.

A system 400 for traceably connecting two optical fiber positions in one or more fiber termination banks is shown in FIG. 4. The system includes an optical fiber jumper cable 401 including a fiber cable 430 and a connector 410 having features similar to those described above with reference to jumpers 200, 201 shown in FIGS. 2A, 2B. Specifically, the jumper 401 includes a conductor 435 extending longitudinally with the cable and having an exposed connecting terminal portion 455.

A locating tone generator 470 is electrically connected to the exposed connecting terminal portion 455 using a connector 416. While the connector 416 is shown schematically as an electrical test clip, the tone generator may be connected to the connecting terminal portion 455 using other electrical connection techniques, such as dedicated connectors, without departing from the invention.

The locating tone generator 470 includes a waveform generator 472 for generating a locating signal to be impressed on the conductor 435. The waveform generator may include adjustment or selection means (not shown) for modifying the frequency, amplitude and/or wave shape of the signal to assure optimum tracing of the conductor through the fiber cross connect facility. For example, characteristics of the signal may be modified according to a desired size of an electromagnetic field generated around the optical fiber, depending on the density of optical fiber cables in the facility. Additionally, it may be desired to trace multiple fibers simultaneously, using different locating tone characteristics for each fiber. The locating tone generator is preferably powered using a battery 474 to obviate the need for a separate power connection.

Once connected to the tracing conductor 435 and powered on, the locating tone generator 470 impresses a locating tone on the tracing conductor 435, creating an electromagnetic field 465 that surrounds the optical fiber cable 430. The electromagnetic field is greatest in intensity near the cable and decreases rapidly in intensity as distance from the cable increases.

A handheld locating tone detector 480, including an antenna 482, is used to trace the optical fiber cable 430. In one embodiment, the detector includes a speaker 485 that emits a presence-indicating signal such as an audible tone that increases in volume as the detected electromagnetic field increases in intensity. The audible tone volume therefore increases as the antenna 482 is brought closer to the fiber cable. A technician is thereby able to locate a particular optical fiber cable by moving the antenna 482 closer to various cables until a cable is found where the audible tone increases as the cable is approached. The presence-indicating tone may alternatively be a visual indicator such as an LED array or an alphanumerical display.

In one embodiment of the invention, the handheld locating tone detector 480 is a standard tool used in tracing copper electrical cables in a central office. A handheld device having a probe for identifying a wire transmitting a locating tone is commonly used in telecommunications central offices for tracing wires. The detector is commonly used in conjunction with a tone generator for impressing the tone on the jumper wire.

Figure 5:
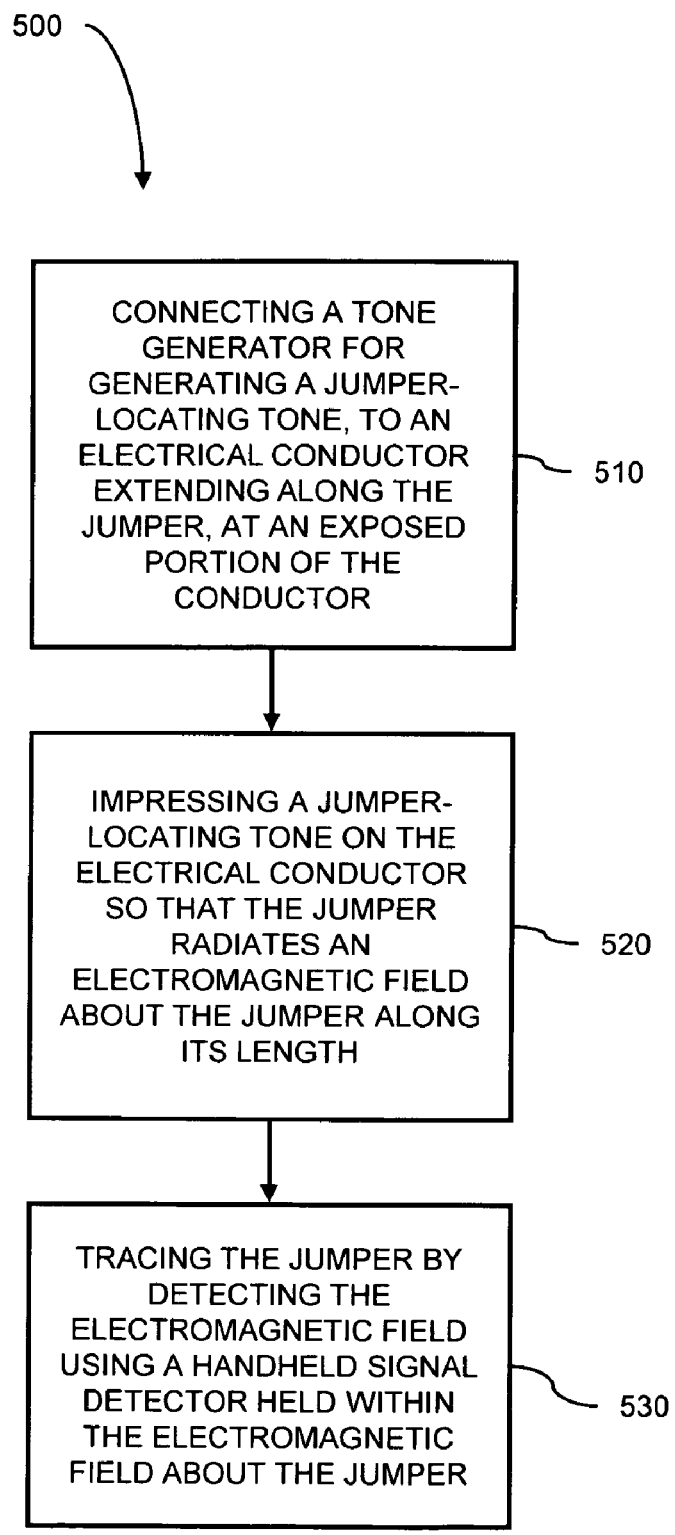
FIG. 5 is a flow chart showing a method in accordance with the present invention.

A method in accordance with the invention is shown in FIG. 5. The method is for tracing an optical fiber jumper in a fiber cross-connect facility containing multiple optical fiber jumpers. A tone generator for generating a jumper-locating tone is connected (step 510) to an electrical conductor extending along the jumper. The connection is made at an exposed portion of the conductor. For example, the connection may be made at a modified portion of the optical fiber connector supporting the exposed portion of the conductor. The connection may utilize a temporary test clip or a dedicated connector, as discussed above.

A jumper-locating tone is then impressed (step 520) on the electrical conductor so that the jumper radiates an electromagnetic field about the jumper along its length. The signal strength decreases as the distance from the cable increases.

The jumper is traced (step 530) by detecting the electromagnetic field using a handheld signal detector held within the electromagnetic field about the jumper.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A system for traceably connecting two optical fiber positions in one or more fiber termination banks, the system comprising:
    an optical fiber jumper including an elongate optical fiber, a coating for protecting the optical fiber along its length, first and second optical fiber connectors at first and second ends of the optical fiber, respectively, for connecting the optical fiber into the one or more fiber termination banks; and an electrical conductor extending lengthwise with the optical fiber, the electrical conductor having at least one connecting terminal portion;
    a locating tone generator having a connector for connecting to the connecting terminal portion of the electrical conductor and for impressing on the electrical conductor a locating tone that causes the conductor to radiate an electromagnetic field about the jumper; and
    a locating tone detector for emitting a presence-indicating signal when at least a portion of the detector is within the electromagnetic field;
    wherein the at least one connecting terminal portion is integrated with an optical fiber connector.

2. The system of claim 1, wherein the presence-indicating signal is emitted by the locating tone detector with increasing intensity as the detector is moved closer to the optical fiber jumper.

3. The system of claim 1, wherein the conductor is a wire and the at least one connecting terminal portion is an exposed portion of the wire.

4. The system of claim 1, wherein the at least one connecting terminal portion is an electrical connector for connecting the tone generator.

5. The system of claim 1, wherein the locating tone generator is powered by at least one battery.

6. The system of claim 1, wherein the locating tone detector is a handheld device.

7. The system of claim 1, wherein the conductor is embedded in the coating of the optical fiber jumper cable.

8. An optical fiber jumper cable comprising:
   at least one optical fiber for conducting an optical signal through the cable;
   a coating for protecting the optical fiber along its length;
   first and second optical fiber connectors at first and second ends of the optical fiber jumper cable, respectively, for connecting the optical fiber into one or more fiber termination banks;
   only one electrical conductor extending substantially the length of the optical fiber; and
   at least one connecting terminal portion of the only one electrical conductor for electrically connecting the conductor to jumper tracing equipment;
   wherein each connecting terminal portion is integrated with one of the optical fiber connectors.

9. The optical fiber jumper cable of claim 8, wherein the conductor is a wire and the at least one connecting terminal portion is an exposed portion of the wire.

10. The optical fiber jumper cable of claim 8, wherein the at least one connecting terminal portion is an electrical connector for connecting the jumper tracing equipment.

\* \* \* \* \*